Sept. 30, 1969   R. C. SMITH ET AL   3,470,018
THIN FILM CAPACITOR

Filed Aug. 24, 1964   2 Sheets-Sheet 1

INVENTORS
RICHARD C. SMITH &
MICHAEL HACSKAYLO

BY *Hurwitz & Rose*

ATTORNEYS

ABSTRACT OF THE DISCLOSURE

A thin film capacitor having stable electrical properties over a high temperature range is formed by depositing a stoichiometric thin film of a rare earth borate as the dielectric between a pair of metal plates or electrodes. A stoichiometric thin film of neodymium borate is formed as the dielectric by vacuum evaporation of a compressed pellet composed of neodymium oxide, boric oxide, and boron nitride powders in the approximate proportions by weight of 50:10:40, respectively, while preventing the deposition of any liberated material until a neodymium borate vapor is released from the remaining evaporant. At that point, blockage of the surface of the metal plate on which the dielectric film is to be deposited is removed to permit coating of that surface to the desired thickness by the neodymium borate.

---

The present invention relates generally to dielectric films that are electrically stable over very wide temperature ranges and more particularly to dielectric films formed from mixtures of rare earth sesquioxides with boric oxide and boron nitride.

To our knowledge there is no presently available method of forming dielectric films with stable high temperature (up to 500° C.) electrical properties from mixtures. While fabrication by thermal evaporation of pure dielectric films from compounds has been reported, investigations have shown that such films exhibit significant changes in capacitance and resistance at temperatures considerably less than 500° C. In particular, pure dielectric films formed by prior art methods are not considered electrically stable over the temperature range from −200° C. to 500° C.

We have found that dielectric films fabricated by thermal evaporation of mixtures of rare earth sesquioxides with boric oxide and boron nitride exhibit very stable electrical characteristics over the aforementioned temperature range. In addition, the films are characterized as having low dissipation factors, low dielectric constants, and high D.C. breakdown strengths as well as high resistivity.

Our experiments indicate that the most stable films appear to be formed from a mixture of neodymium oxide ($Nd_2O_3$), boric oxide ($B_2O_3$) and boron nitride (BN) powders. These compounds are mixed in a manner such that the BN particles are in close proximity to the $Nd_2O_3$ and $B_2O_3$ particles. When the mixture is heated in a vacuum deposition chamber, the close proximity of the composite particles in the mixture enables the boron nitride to react with the neodymium oxide and the vapor deposited dielectric film is believed to be $NdBO_3$ neodymium borate. The dielectric constant of this film is substantially constant (±2%) over the temperature range −200° C. to 500° C.; its dissipation factor is virtually zero from −200° C. to 400° C.; and its dielectric breakdown strength varies between $2\times10^6$ and $3\times10^6$ volts per centimeter between −200° C. and 550° C. The mean dielectric constant of these films (averaged over some 800 samples) was found to be 3.0 with a standard deviation of ±.3. However, values as high as 4.0 or as low as 2.0 have been measured.

It is an object of the present invention to provide a new and improved dielectric film and method for making same.

Another object of the invention is to provide a thermally evaporated dielectric film having greater stability of electrical parameters over wider temperature ranges, including the high temperature region, than any previously known thermally evaporated film.

A further object of the invention is to provide a method for vacuum depositing dielectric films formed from mixtures of rare earth sesquioxides and certain metal nitrides and/or oxides.

Yet another object of the invention is to provide a mixture of dielectric materials that can be vapor deposited as a dielectric film.

Still another object is to provide a new and improved thin film capacitor that is electrically stable over a very wide temperature range.

The above and still further objects, features and advantages of the present invention will become apparent upon consideration of the following detailed description of one specific embodiment thereof, especially when taken in conjunction with the accompanying drawings, wherein.

Figure 1:
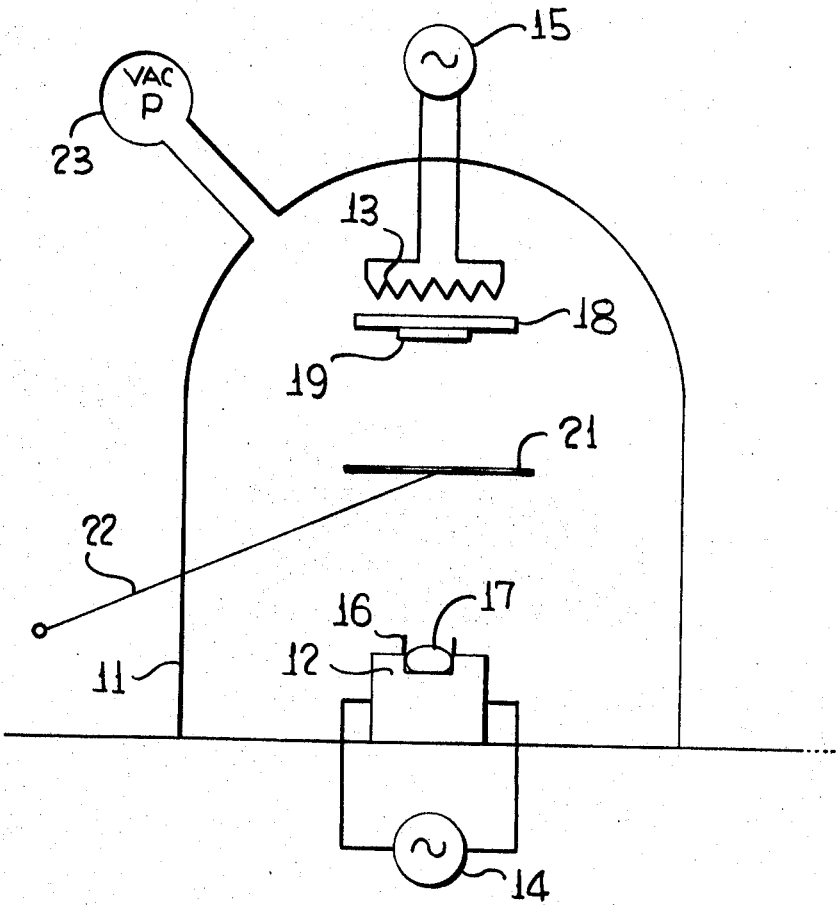
FIGURE 1 is a schematic diagram of the apparatus utilized in fabricating a film of the present invention.

Reference is now made to FIGURE 1 wherein bell jar 11 has located interiorly thereof towards its base and apex electric heaters 12 and 13, powered by A.C. sources 14 and 15, respectively. Carbon heater 12 is in the form of a crucible that is provided with a centrally located bore for receiving inert liner 16, preferably fabricated from boron nitride, thorium oxide or zirconium oxide. Dielectric evaporant mixture 17 is placed on liner 16. Positioned upstream of crucible 12, in proximity to infrared heater 13, is horizontally extending plate 18 that carries substrate 19 on which the film is to be deposited. In the evaporant stream intermediate of crucible 12 and plate 18, is shutter 21 that is rotated in response to turning of rod 22. With shutter 21 in the horizontal position, evaporant deposition on substrate 19 is precluded. The entire system is evacuated to about $1\times10^{-5}$ mm. of mercury by vacuum pump 23 prior to any deposition operation.

Figure 2:
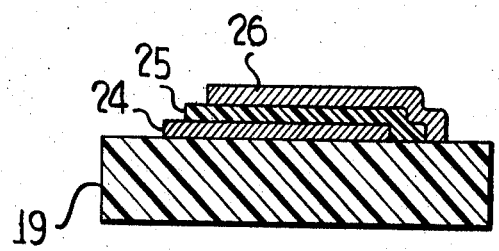
FIGURE 2 is a side sectional view of a capacitor containing a film according to the present invention.

In operation, metal film 24, FIGURE 2, is deposited as one electrode of the capacitor being formed to the desired thickness, generally between 1000 A. and 10,000 A., on insulating substrate 19, that is generally glass or fused silica. Film 24 is formed by evaporating the appropriate metal, preferably gold or aluminum, although copper, silver, platinum and others are satisfactory, in bell jar 11 by utilizing standard vacuum deposition techniques. After layer 24 is deposited, dielectric pellet 17 previously placed in liner is heated.

In the preferred embodiment, pellet 17 is prepared by mixing very pure neodymium oxide ($Nd_2O_3$), with boron oxide ($B_2O_3$) and boron nitride (BN) in proportions by weight of 50:10:40, respectively. Each of these proportions can vary within ±10. The mixture is then ground very finely so it can pass through a sieve with #200 mesh. The powdered mixture is then pressed at room temperature to 20,000 p.s.i. into pellets. The pellets are then fired at 1200° C. for one half hour, etched in dilute HCl and ground again so they can pass through the #200 mesh sieve. The operation is repeated until the pellets appear to be a homogeneous mixture. In the mixture thus formed, a close proximity of the composite particles is achieved.

With the pellet previously placed in liner 16 and shutter 21 blocking the stream between liner 16 and substrate 19 and pressure reduced in bell jar 11 to approximately $10^{-5}$ mm. of Hg, power is applied by source 14 to crucible 12, raising the temperature of pellet 17. Prior to exposure of substrate 19 to the vapor portions of pellet 17, the pellet begins to melt at 1200° C. Boron oxide is thereafter released when the melt in liner 16 reaches a temperature of approximately 1500° C. No boron oxide film is, however, formed on substrate 19 because of the blocking condition of shutter 21. Once the boron oxide has been driven off from the evaporant remaining in liner 16, crucible 12 is heated at a faster rate to approximately 2100° C. causing liberation of a gas believed to be nitrogen. When sufficient gas is released to cause the pressure inside bell jar 11 to reach $4 \times 10^{-4}$ mm. of Hg, reaction of the remaining $Nd_2O_3$ and BN occurs to form a vapor, believed to be neodymium borate, $NdBO_3$. Shutter 21 is then rotated to a vertical position allowing deposition of the vapor as stoichiometric thin film 25 on the unmasked surfaces of substrate 19 and metal layer 24.

While boron oxide takes no active part in the deposition process it is necessary in forming pellets 17 so that the boron nitride and neodymium oxide particles therein are completely enveloped, i.e., boron oxide acts as a binder between these materials. If these materials are not thereby enveloped, they will be frequently ejected from liner 16 into bell jar 11 at temperatures lower than the mixture vaporization temperature. This is because the boron nitride and neodymium oxide particles are so light that locally generated gas pressures occurring within liner 16 can displace the material from its confines.

We feel the reaction that occurs at approximately 2100° C. is

$$2Nd_2O_3 + 14BN \rightarrow 2NdB_6 + 2NdBO_3 + 7N_2\uparrow$$

The neodymium hexaboride ($NdB_6$) is left as a residue in liner 16 while the nitrogen gas escapes into bell jar 11 and is withdrawn by pump 23.

During the entire deposition operation, sufficient power is supplied to heater 13 by source 15 so that substrate 18 is maintained between 100° C. and 150° C. This temperature elevation provides greater adherence of the molecules in film 25 to layer 24 and substrate 19.

Various condensation rates between 0.1 A. and 60 A. per second on substrate 19 are achieved by raising the temperature within liner 16 to appropriate values above the 2100° C. reaction temperature for the mixture.

The capacity between metal electrodes 24 and 26 is determined by the thickness of film 25 which is dependent on the length of time for which the process is conducted. We have found that satisfactory capacitors have been formed with films ranging in thickness from 300 A. to 80,000 A.

After dielectric film 25 has been deposited, metal film 26 is formed as the second capacitor electrode by conventional vacuum deposition techniques.

Figure 3A:
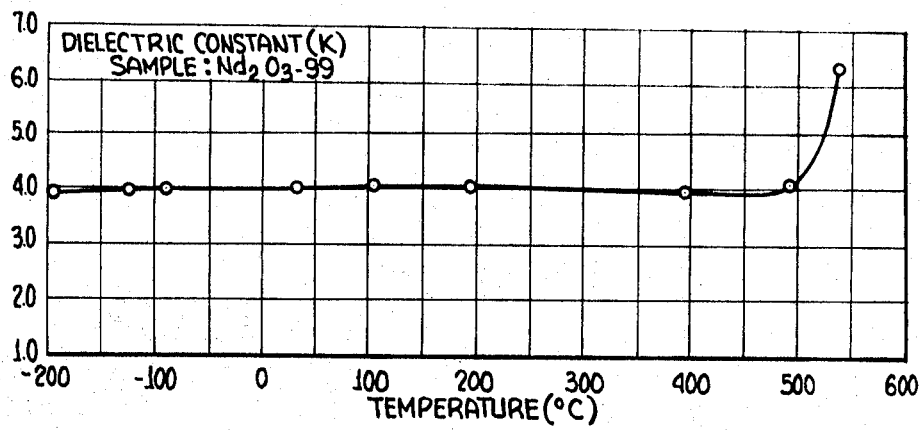
FIGURES 3a, 3b and 3c illustrate the electrical characteristics of a capacitor employing the film of a preferred embodiment of the invention.
Figure 3B:
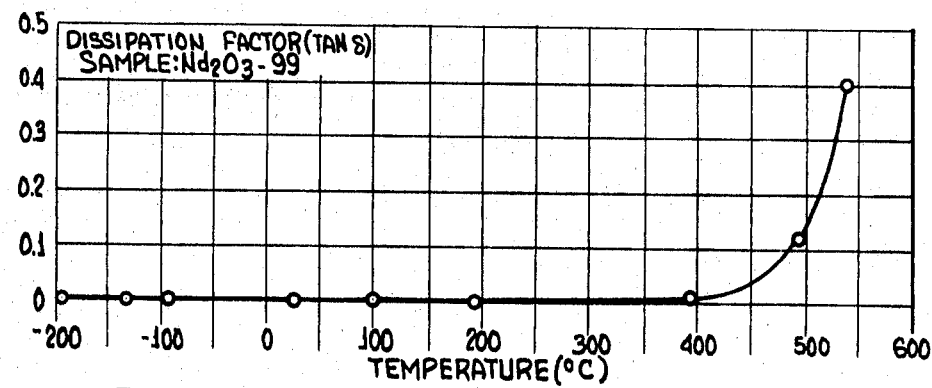
Figure 3C:
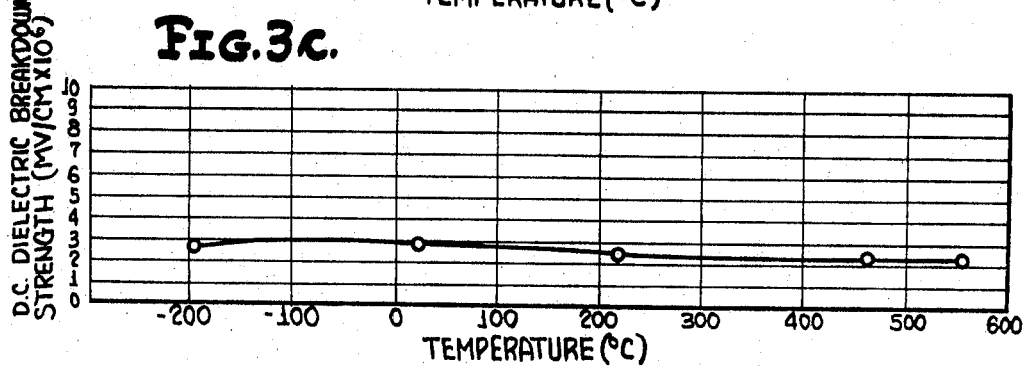

Capacitors fabricated from the $Nd_2O_3$, $B_2O_3$ and BN pellets by the described method have exhibited the highly stable temperature characteristics illustrated in FIGURES 3a, 3b, and 3c. It is noted from FIGURE 3a that the dielectric constant, $\epsilon$, is virtually a constant value of 4.0 for all values between $-200°$ C. and $+500°$ C. and that the value increases markedly only above 500° C. FIGURE 3b shows that the dissipation factor (tangent of 90° minus the phase angle difference between the voltage applied across the capacitor and the current flowing through it) is virtually zero everywhere between $-200°$ C. and $+400°$ C. FIGURE 3c illustrates that the D.C. dielectric breakdown strength is observed to be between $2 \times 10^6$ and $3 \times 10^6$ volts per centimeter for the range $-200°$ C. to $+550°$ C. The fact that this curve is not nearly as constant in value as the curves of FIGURES 3a and 3b is not a deterrent to use of the capacitor because there is usually no practical need for constant breakdown strength; there is only a requirement, particularly in thin film circuits, that the strength value remain within predetermined limits.

We have also found from X-ray and electron diffraction patterns as well as infrared transmission curves of the deposited films that they are glassy in structure. In the $NdBO_3$ (which can be expressed as $Nd_2O_3 \cdot B_2O_3$) the glass former appears to be $B_2O_3$ with the neodymium present as a network modifier.

While the preferred embodiment has been described in terms of a $Nd_2O_3$, $B_2O_3$, BN mixture, we have found that satisfactory dielectric films have also been attained with other mixtures employing rare earth sesquioxides. It has been found that a mixture of $Nd_2O_3$, $B_2O_3$ proportioned by weight as 3:1 for the respective compounds can provide a film having virtually the same attributes as the film formed with the preferred mixture. Such a film is formed by heating the $Nd_2O_3$, $B_2O_3$ mixture to its melting point, 1200° C., then increasing the melt temperature quickly to above 2000° C., and thereafter rotating shutter 21 to expose substrate 19 to the evaporant. It is necessary to heat the melt rapidly from 1200° C. to above 2000° C. so that most of the boric oxide remains in liner 16 when the neodymium oxide begins to vaporize. If this procedure is not followed, dielectric layer 25 is formed nonstoichiometric, resulting in electric parameters that are unpredictable as a function of temperature. When the $Nd_2O_3$, $B_2O_3$ mixture is properly evaporated, we believe that layer 25 is formed as a $NdBO_3$ film according to the reaction of $Nd_2O_3 + B_2O_3 \rightarrow 2NdBO_3$. In conducting this reaction, it is possible to substitute a tungsten boat for inert boron nitride liner 16 and crucible 12, such a substitution being possible since tungsten does not react with $Nd_2O_3$ or $B_2O_3$ as it does with BN at the temperatures involved.

In our experiments, we have also found that films possessing satisfactory characteristics are attained when pellets are formed by a mixture of boron nitride with boron oxide and one of the following: ytterbium oxide ($Yb_2O_3$), europium oxide ($Eu_2O_3$), samarium oxide ($Sm_2O_3$), and lanthanum oxide ($La_2O_3$). The proportions of these mixtures are similar to those of the preferred embodiment, i.e. $10\% \pm 10\%$ $B_2O_3$, $40\% \pm 10\%$ BN and $50\% \pm 10\%$ rare earth sesquioxides ($R_2O_3$, where R is a rare earth), where each percentage is by weight. The pellets are vacuum deposited in a manner similar to the described process for the $Nd_2O_3$, BN, $B_2O_3$ pellets with similar reactions occurring.

In addition, we have fabricated dielectric films having desirable electrical parameters versus temperature by forming pellets consisting of a mixture of:

| | Percent by wt. |
|---|---|
| $CeO_2$ | $40 \pm 10$ |
| $B_2O_3$ | $20 \pm 10$ |
| BN | $40 \pm 10$ |

These pellets are formed and vacuum deposited substantially in the same manner as described above for the $Nd_2O_3$, $B_2O_3$, BN pellets. The dielectric film is believed to be $CeBO_3$.

Generalizing, it is seen that the dielectric film formed on substrate 19 and metal layer 25 in accordance with the present invention appears always to be of the chemical form $RBO_3$, where R is any metal from the rare earth group.

We have also experimented and found that silicon nitride (SiN) and aluminum nitride (AlN) can be substituted for boron nitride in each of the appropriate cases. While the $RSiO_2$ and $RAlO_3$ dielectric films formed utilizing SiN and AlN are not as temperature stable as those in which BN is employed, they are acceptable for some purposes.

While we have described and illustrated several specific embodiments of our invention, it will be clear that variations of the details of construction which are specifically illustrated and described may be resorted to without departing from the true spirit and scope of the invention as defined in the appended claims.

We claim:

1. The capacitor formed by the process of depositing, on a metal layer, a thin dielectric film evaporated under vacuum at elevated temperatures from a compressed mixture of a rare earth sesquioxide, boron oxide, and boron nitride in the respective relative proportions by weight of 50:10:40, and subsequently depositing a second metal layer on the exposed surface of the dielectric film; wherein the rare earth sesquioxide is selected from the group consisting of $Nd_2O_3$, $Yb_2O_3$, $Eu_2O_3$, $Sm_2O_3$, and $La_2O_3$, the dielectric film is deposited to a thickness in the range from 300 angstroms to 80,000 angstroms, and each of the metal layers has a thickness in the range from 1000 angstroms to 10,000 angstroms; and wherein the surface of the metal layer on which said dielectric film is to be deposited is blocked while said compressed mixture is elevated to a temperature of approximately 1500° C. at a pressure of about $10^{-5}$ mm. of Hg, and the mixture is thereafter rapidly elevated to a temperature of approximately 2100° C. and the pressure increased to about $4 \times 10^{-4}$ mm. of Hg, after which the metal layer surface is exposed to the material evaporating from said mixture to permit said material to be deposited thereon.

2. Process of producing a thin film capacitor, which comprises:
vacuum vapor depositing on a layer of metal a film of dielectric material evaporating from a substantially homogeneous mixture of $Nd_2O_3$, $B_2O_3$, and BN in the approximate proportions by weight of 50:10:40, respectively, with the mixture heated to approximately 2100° C. under a pressure of about $4 \times 10^{-4}$ mm. Hg, to a film thickness in the range from 300 angstroms to 80,000 angstroms, and thereafter depositing a further layer of metal on the exposed surface of the dielectric film.

3. The capacitor produced by the process of claim 2.

4. Process of producing a thin film capacitor, which comprises:
depositing on a first electrode layer a film of dielectric material evaporating from a homogeneous mixture of a rare earth sesquioxide, $B_2O_3$, and BN, in the approximate proportions by weight of 50:10:40, respectively, heated to a temperature of at least about 2100° C. under a pressure of approximately $4 \times 10^{-4}$ mm. Hg, until said film reaches a desired thickness in the range from 300 to 80,000 angstroms, and then applying a second electrode layer on the surface of the dielectric film opposite the first electrode layer.

5. The capacitor produced by the process of claim 4.

6. Process of producing a thin film capacitor on a suitable substrate, which comprises:
heating the substrate to a temperature of from 100° C. to 150° C. in a container evacuated to a pressure of about $10^{-5}$ mm. Hg, and maintaining the temperature of the substrate within that temperature range while vacuum vapor depositing a metal layer to a thickness of between 1000 angstroms and 10,000 angstroms on the substrate as one electrode of the capacitor, and heating a substantially homogeneous mixture of $B_2O_3$, BN, and a rare earth sesquioxide from the group consisting of $Nd_2O_3$, $Yb_2O_3$, $Eu_2O_3$, $Sm_2O_3$, and $La_2O_3$, in the approximate proportions by weight of 10:40:50, respectively, to a temperature of at least approximately 2100° C. until the pressure in said container is increased to approximately $4 \times 10^{-4}$ mm. Hg, and then depositing the dielectric material evaporating from said mixture onto said metal layer at a rate of from 0.1 angstrom to 60 angstroms per second until a dielectric film having a thickness in the range from 300 angstroms to 80,000 angstroms is produced, and thereafter
vacuum vapor depositing on the exposed surface of said film another metal layer as the other electrode of the capacitor.

7. The capacitor produced by the process of claim 6.

References Cited

UNITED STATES PATENTS

| | | | |
|---|---|---|---|
| 3,387,999 | 6/1958 | Hacskaylo et. | |
| 2,398,088 | 4/1946 | Ehlers et al. | 252—63.2 X |
| 2,691,738 | 10/1954 | Matthias | 23—52 X |
| 2,812,234 | 11/1957 | Robinson | 252—63.2 X |
| 3,294,701 | 12/1966 | Vogel | 23—59 X |

OTHER REFERENCES

Chemical Abstracts 50, 2350a.
E. J. Felten, Preparation and Properties of Some Rare Earth Borates in Journal of Inorganic Nuclear Chemistry, pp. 61–64, 1961, vol. 19.
Chemical Abstracts 56, 8314g.

ALFRED L. LEAVITT, Primary Examiner

C. K. WEIFFENBACH, Assistant Examiner

U.S. Cl. X.R.

117—106, 211, 227, 229; 317—258